Sept. 4, 1923.
E. R. CALTHROP
PARACHUTE
Filed Oct. 23, 1919
1,466,988
3 Sheets-Sheet 1
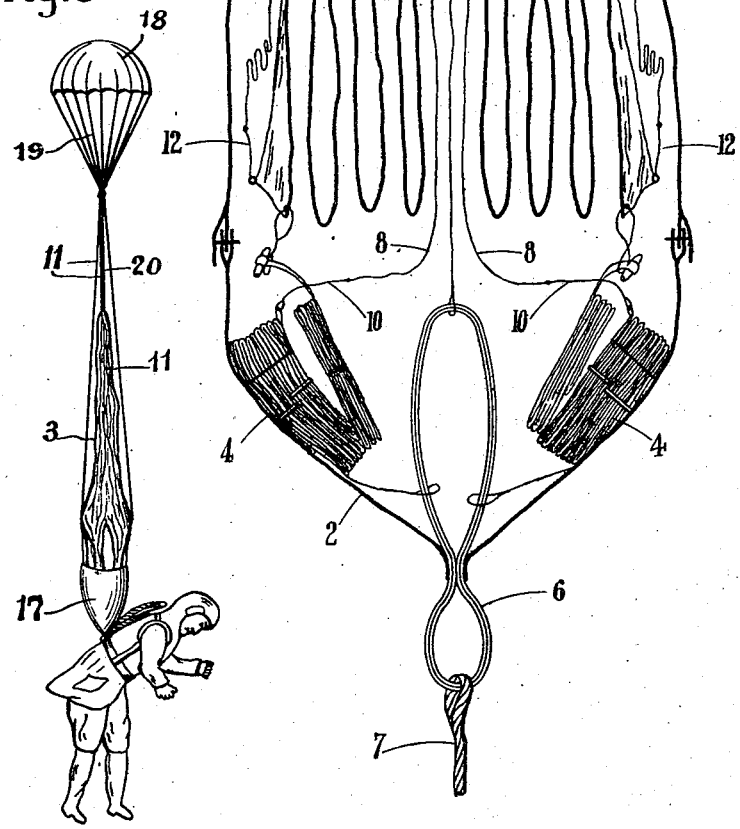
Fig.1.
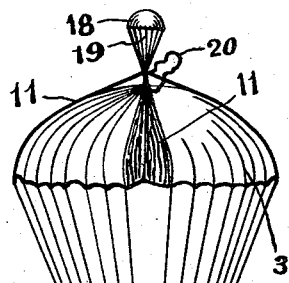
Fig.9.
INVENTOR
Everard Richard Calthrop
By Lawrence Langner
Attorney.

Sept. 4, 1923.  1,466,988
E. R. CALTHROP
PARACHUTE
Filed Oct. 23, 1919   3 Sheets-Sheet 2

INVENTOR
Everard Richard Calthrop
By Lawrence Langner
Attorney.

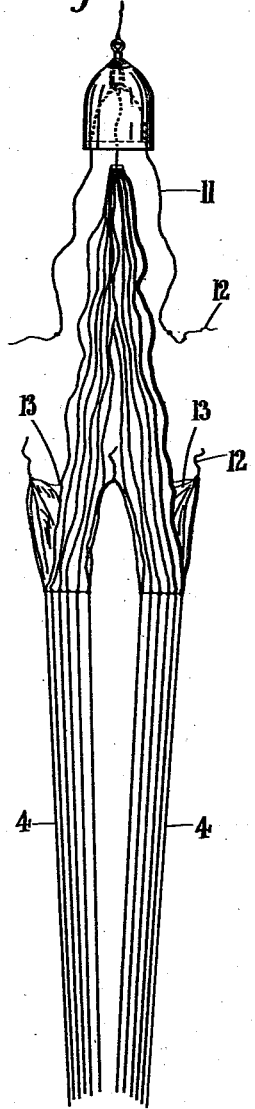
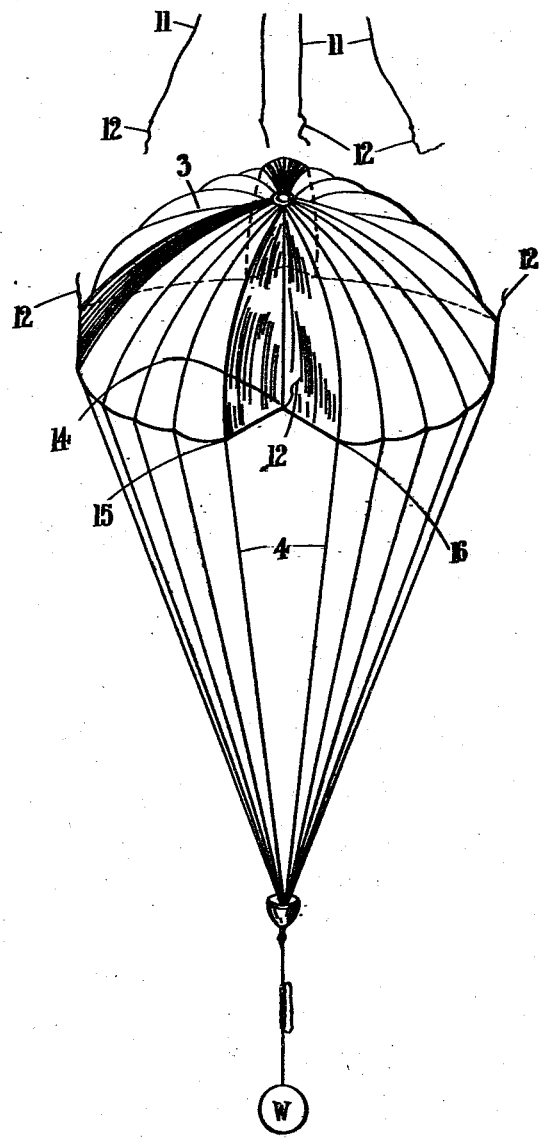

Patented Sept. 4, 1923.

1,466,988

UNITED STATES PATENT OFFICE.

EVERARD RICHARD CALTHROP, OF LONDON, ENGLAND, ASSIGNOR TO E. R. CALTHROP'S AERIAL PATENTS LIMITED, OF LONDON, ENGLAND.

PARACHUTE.

Application filed October 28, 1919. Serial No. 332,799.

(GRANTED UNDER THE PROVISIONS OF THE ACT OF MARCH 3, 1921, 41 STAT. L., 1313.)

*To all whom it may concern:*

Be it known that I, EVERARD RICHARD CALTHROP, subject of the King of Great Britain, and resident of Eldon Street, London, in the county of Middlesex, England, have invented a certain new and useful Improvement Relating to Parachutes, of which the following is a specification.

This invention has reference to parachutes and relates more particularly to that type of parachute which is carried by the aircraft or attached to the person of the aviator in a nested or pleated and folded condition and is released and launched by the application of the load.

The object of the invention is to provide a simple and efficient means of bringing about the automatic opening or expansion of the mouth of the parachute body as it is launched so that it shall be caused to entrap the necessary quantity of air to ensure the complete expansion of the parachute and so safely support its load in its descent to the ground.

With this object in view and such others as may hereinafter appear or are incidental thereto my invention may be said to consist in providing means whereby as the pleated body of the parachute is launched by the weight of the load a drag or resistance shall be exerted upon portions of the peripheral edge of the parachute body in such a manner as to cause certain of the pleated gussets to be pulled apart thereby allowing the requisite quantity of air to gain access to the interior of the body of the parachute to ensure its positive expansion to its full extent.

In order that my invention may be readily understood and carried into effect same will now be described more fully with reference to the accompanying drawings in which:—

Figure 1 represents more or less diagrammatically a vertical section through a nested parachute and its container the parachute having my present invention applied thereto.

Figures 2-7 represent a series of diagrams illustrating the various successive stages in the opening of a parachute to which the present invention is applied.

Figures 8 and 9 illustrate a slightly modified form of my invention.

Figure 2:

Referring first to Figure 1 the parachute launching device there illustrated comprises a bi-part container of flexible waterproof material consisting of the upper and lower portions 1 and 2 respectively. The parachute body 3 and its packed rigging tapes 4 is nested within said container the two portions of which are retained normally in operative relation with each other by the rupturable connection 5 which is fractured when the weight of the load is exerted upon the lower portion 2 of the container through the loop 6 to which the load rope 7 is positively attached. The numeral 8 indicates cords of which a plurality are made fast at one end to the loop 9 of the suspension member which serves for attaching the upper part 1 of the container to the aerial craft the opposite ends of said cords 8 being connected by rupturable connections 10 to the packed rigging tapes 4.

The construction so far described forms no part of the present invention the several parts having been described in detail and their operation explained in various specifications of Letters Patent filed by me which are of prior date hereto.

In carrying the present invention into effect I provide a plurality of tapes 11 the ends of which are secured to the looped member 9 and to rupturable connections 12 attached to the periphery of the parachute body 3 preferably midway between the points at which the rigging tapes are secured to said periphery. Said tapes 11 are of a length somewhat less than the distance from the center of the parachute body to its periphery the object of which will be apparent when the operation of my improved device which I will now proceed to describe is considered.

Figure 3:
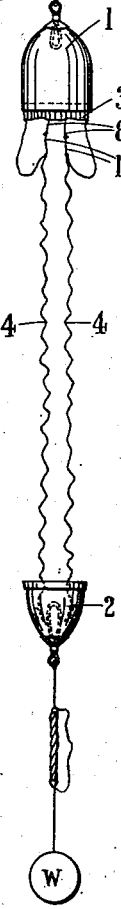
Figure 4:
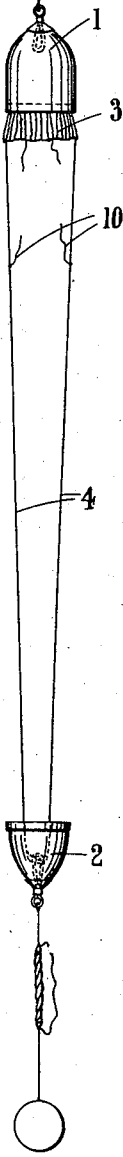
Figure 5:
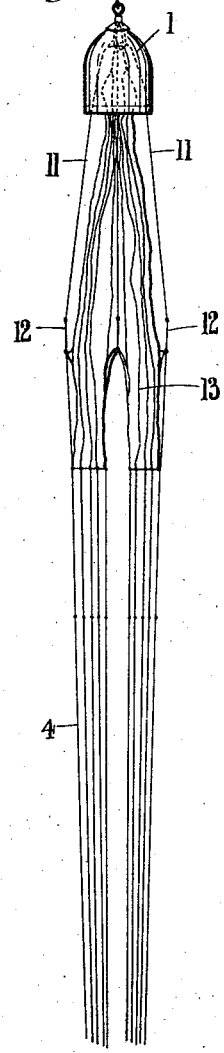

Figure 2 represents the parachute container as a whole in the position it would occupy when suspended from an aircraft and adapted for the launching of the parachute contained therein. When the weight of the load W is applied the rupturable connection 5 will snap and the lower portion 2 of the bi-part container will separate from the upper portion 1. The rigging tapes 4 will then be fully extended against the resistance of the cords 8 as illustrated in Figs. 3 and 4 whereupon the rupturable connections 10 will break and the weight of the load will be exerted upon the periphery of the parachute body 3. The parachute body will continue to be extracted by the weight of the load and the tapes 11 will be extended to their full length as represented in Fig. 5 where they are shown as exerting a drag upon those portions 13 of the peripheral edge of the parachute to which they are attached by the rupturable connections 12 thus causing the pleats of the parachute body to be pulled upwards and apart so allowing air without possibility of obstruction to enter the interior of the parachute body to ensure its preliminary expansion. When the strain exerted upon the rupturable connections 12 by the opening of the parachute exceeds the strength of said connections 12 they will of course snap—see Fig. 6—thus releasing the periphery of the parachute body which will then be free to expand to its full extent as shown in Fig. 7 to support the load safely in its descent to the ground. As already stated the tapes 11 and rupturable connections 12 are attached to the periphery of the parachute body intermediate any two points where the rigging joins the periphery and this may be accomplished in any suitable manner, for example separate eyelets may be provided in the peripheral portion of the parachute body to receive the connections 12 or these latter may be attached to the peripheral portion by means of one of the usual eyelets provided for the rigging tapes. Such an arrangement is illustrated in diagram F where the rigging tapes which would normally be secured to the eyelet 14 is shown as transferred to the eyelet 15 so that two tapes are connected to this point. Again I may attach an additional tape to the eyelets 15 and 16 to compensate for the removal of the rigging tape from the eyelet 14.

Although I have described my invention as applied to a parachute adapted to be launched from a container suspended from an aircraft I desire it to be understood that the means described for ensuring the positive opening of the mouth of the parachute body is also applicable to any type of parachute adapted to be stowed within and launched from a container or case by the application of the load. For example the invention may be employed in connection with parachutes stowed in a casing carried by an aviator knapsack fashion. It may also be used in connection with parachutes carried in a container secured to the person of the aviator and in which a pilot parachute is employed to extract the main parachute. Such an arrangement is illustrated in Figures 8 and 9 wherein the numeral 17 indicates the container secured to the aviator and 18 the pilot parachute the rigging 19 of which is attached by a cord 20 to the apex of the main parachute 3. The aforesaid tapes 11 are positively attached both to the rigging 19 and to the peripheral portion of the parachute 3 the pilot parachute 18 constituting the necessary resistance required for raising and pulling apart the peripheral pleats of the parachute 3 as will be readily understood from an inspection of the figures of the drawing now under discussion. In this aspect of my invention the aforementioned rupturable connections 12 are unnecessary as it will be apparent that when the main parachute 3 expands fully so that the periphery is in full tension the tapes 11 under the exertion of this superior power will pull the pilot parachute 18 down towards the apex of the main parachute 3 and the cord 20 will thus be slackened as shown in Figure 9.

A similar arrangement may be adopted where the parachute is abstracted from its container by a pilot parachute which is projected above the fuselage of an aeroplane by the current of air incidental to the flight of the aeroplane but I have not illustrated this application of my invention as the arrangement would be similar to that described with reference to Figures 8 and 9 and will be readily understood without further explanation.

In cases where a pilot parachute is employed this latter extended by the volume of compressed air flowing through the central aperture of the main parachute during its descent assists in retarding the fall the resistance of the pilot parachute being communicated through the aforesaid tapes 11 and not by the cord 20 to the apex.

I claim:

1. A parachute, a container and means for launching said parachute comprising a plurality of rupturable cords one end of each of which is attached to one of a series of tapes connected to a suspension member which serves for attaching the container to the aerial craft and the other end of each of which is attached to the peripheral edge of the parachute, said tapes being of a length which is less than the distance from the centre of the parachute body to its periphery and serving to positively open portions of the peripheral edge of the parachute and the cords connected to said tapes being ruptured by the weight of the falling load to release the mouth and permit of the complete expansion of the parachute body.

2. A parachute, a container, rigging tapes and means for launching said parachute comprising a plurality of rupturable cords one end of each of which is attached to one of a series of tapes connected to a suspension member which serves for attaching the container to the aerial craft and the other end of each of which is attached to the peripheral edge of the parachute midway between the points at which the rigging tapes are secured to said periphery, the tapes connected to the suspension member being of a length somewhat less than the distance from the centre of the parachute body to its periphery and serving to positively open portions of the peripheral edge of the parachute and the cords connected thereto being ruptured by the weight of the falling load to release the mouth and permit of the complete expansion of the parachute body.

Signed at London, in the county of Middlesex, and England, this 18th day of September A. D. 1919.

EVERARD RICHARD CALTHROP.